United States Patent [19]

Baur

[11] 4,413,435
[45] Nov. 8, 1983

[54] PICTURE VIEWER

[75] Inventor: Max Baur, Kollbrunn, Switzerland

[73] Assignee: Licinvest AG, Chur, Switzerland

[21] Appl. No.: 221,165

[22] Filed: Dec. 29, 1980

Related U.S. Application Data

[62] Division of Ser. No. 943,471, Sep. 18, 1978, Pat. No. 4,241,529.

[30] Foreign Application Priority Data

Sep. 20, 1977 [DE] Fed. Rep. of Germany ....... 2742351
Oct. 7, 1977 [DE] Fed. Rep. of Germany ....... 2745214
Dec. 16, 1977 [DE] Fed. Rep. of Germany ... 7738461[U]

[51] Int. Cl.³ .......................... A47G 1/06; G09F 1/12
[52] U.S. Cl. ......................................... 40/155; 40/156; 40/489; 40/490
[58] Field of Search .................... 40/152.1, 152.2, 155, 40/156, 152, 489, 490

[56] References Cited

U.S. PATENT DOCUMENTS

| | | | |
|---|---|---|---|
| 535,635 | 3/1895 | Stone | 40/509 |
| 1,359,662 | 11/1920 | Blyth | 40/152.1 |
| 2,881,544 | 4/1959 | Knox | 40/156 |
| 2,943,536 | 7/1960 | Stafford | 40/152.1 |
| 3,377,727 | 4/1968 | Weggeland | 40/511 |
| 3,495,345 | 2/1970 | Weggeland | 40/490 |
| 3,798,812 | 3/1974 | Ball | 40/509 |
| 3,837,987 | 9/1974 | Williams et al. | 40/152.1 |
| 4,258,489 | 3/1981 | Maguire | 40/152.1 |

Primary Examiner—John J. Wilson
Attorney, Agent, or Firm—Peterson, Palmatier, Sturm, Sjoquist & Baker, Ltd.

[57] ABSTRACT

A picture displaying frame having a front viewing window, a rear wall behind the displayed picture, a slot along the bottom edge, a swing out prop in the rear wall for standing the frame in upright position, a picture transporting slider in the prop with a picture engaging retentive element to frictionally engage the picture for sliding it out of the slot.

8 Claims, 11 Drawing Figures

PICTURE VIEWER

This application is a division of application Ser. No. 943,471, filed Sept. 18, 1978, now U.S. Pat. No. 4,241,529, Dec. 30, 1980.

The invention relates to an apparatus for the alternate exposure of individual sheets from a pile of sheets, in particular to a photo-viewing change device, having a bearing face for the sheet edges at one side of a pile of sheets and having an access means or a shifting device for shifting an end sheet of the pile of sheets parallel to its sheet face.

BACKGROUND OF THE INVENTION

A device of this type, which is provided as a change device for pictures, diapositives, advertising texts or the like, is known from DT-PS No. 873 908. This known change device is not suitable, however, for the reliable change of relatively thin sheets, which in addition have relatively large dimensional tolerances, such as, for example, normal photographs.

The difficulties involved in creating a photo-viewing change device of the type mentioned at the beginning, which functions reliably, is constructed as simply as possible and can be manufactured at a favourable cost, arise in particular from the fact that the photographs that are alternately to be exposed to view by such a photo-viewing change device are, in spite of their identical format, in many respects different, depending on which manufacturers have supplied the paper and chemicals for developing the photographs and depending on which printing company has produced the finished photographs therefrom.

The photographs supplied by the printing firms are not only of different sizes, the final sizes of 9×9 cm (more precisely 8.9×8.9 cm), 9×11.5 cm and 9×11.7 cm as well as 9×13 cm being the most customary, but within these nominal final sizes relatively large dimensional tolerances exist which may amount to 5 mm and which result from the fact that the photographs are made into the final size in a wide variety of methods and manners, such as, for example, by punching out, cutting up, cutting off from paper rolls etc. Furthermore, the thickness of the photographs can vary widely depending on the manufacturer. Photographs are, for example, generally between 0.25 and 0.3 mm thick, but may also be thicker or thinner than this.

Also, the photographs may have rectangular or rounded corners and the edges of the pictures may be differently formed, depending on the manner in which the picture is made into its final size, and may, where applicable, have ridges resulting from cutting.

Finally, the different photographs may be of different strengths and curved in different directions, since the so-called photographic paper does not, in fact, consist of paper, but comprises a plastics carrier which looks like paper on which a large number of different chemical layers is disposed which are stored or embedded in gelatine. Gelatine is a natural product and its properties therefore vary enormously. In particular, gelatine is relatively strongly hygroscopic whereas the plastics carrier is considerably less hygroscopic, so that depending on the air humidity, tensions of varying stength arise between the plastics carrier and the gelatine layers resulting in the very wide variety of curvature of photographs. This curvature is furthermore additionally influenced by the mentioned chemical layers, which are embedded in the gelatine and consist of at least one layer for protection against light, one filter layer, one fixing layer, one protective layer and three color layers and optionally further layers depending on which manufacturer has supplied the paper and which special chemical processes have been used for the development.

SUMMARY OF THE INVENTION

The picture carrier according to the invention, which is provided with a frame that defines a viewing aperture for the picture and which has a rear wall having a support face for the rear side of the picture is, in accordance with the invention, characterized in that there is formed between the rear wall and the frame joined therewith a gap extending around the frame, wherein the plane of the gap extends preferably parallel to the support face and the gap is completely or partially closed towards the lateral edges of the picture carrier but preferably at at least one longitudinal and/or transverse side of the picture carrier extends through to the outside of the picture carrier, and especially in that the gap extends parallel to the support face through to the outside of a lateral edge of the picture carrier and especially over its entire width to the outside of that lateral edge of the picture carrier.

With such a picture carrier, the picture can be inserted through the gap which extends through to the outside and which in relation to the remaining dimensions of the picture carrier is so thin that in practice it is not visible or does not perceptibly intrude, and the inserted picture is held self-mounted by the picture carrier, since its edges are located in the surrounding gap and are thus held in a very simple manner between the frame and the rear wall.

The self-mounting of the picture is in very many cases, especially in the case of photographs of the standard sizes of, for example, 9×12 and 13×18 cm, so good that the picture is held flat by the said self-mounting and a glass cover or similar transparent cover is not necessary. Especially in the case of large formats, such as relatively large graphic prints, it is, however, possible, to make the gap so thick that, together with the picture, a transparent film or a thin plate of transparent material, for example acrylic glass, and/or a thin, plate-like support protecting the rear side of the picture when it is inserted, for example, in the case of sensitive graphics, can be pushed simultaneously with the picture through the gap into the picture carrier.

A frame of this type can be made of two parts, or even of only one part, in a simple manner, for example, by appropriate plastics moulding techniques that are known per se, and it can at the same time be so formed that the appropriate holes, by means of which the picture carrier can be suspended in the upright or horizontal position from a nail or pin or the like hammered into the wall, are present on the rear side of the rear wall.

So that the picture carrier can also be stood on a support, for example a table, shelf or the like, it is preferably provided with a prop which is so arranged that it can be sunk flush in the rear wall and is pivotable therefrom, and is so mounted in the rear wall that it can be adjusted to and automatically locks in, a wide variety of angular positions, so that the picture carrier can be stood at a large number of different angles of inclination, either upright or horizontally. The automatic locking in position may be effected especially by jamming and/or by serrations, as explained in more detail below.

Together with the prop, the picture carrier according to the invention can therefore be made of three parts, that is, the frame, the rear wall and the prop, or of two parts, the frame and rear wall then being integrally formed and constituting the first part, and the prop constituting the second part. Finally, it is also possible, when using a suitable material, to produce the frame, the rear wall and the prop integrally, the prop being joined to the rear wall of the remaining part of the picture carrier by a pliable plastics joint integrally formed with the prop and with the rear wall.

When, in this connection, it is considered that there are at least five large photographic paper manufacturers, that is to say, Kodak, Agfa, Fuji, 3M and Sakura, which each produce different photographic papers, and that there are innumerable printing companies, which treat the photographs using a wide variety of apparatuses, especially for producing the final size, then it becomes clear that the main problem in creating an operationally reliable photo-viewing change device is to ensure that, in fact, the most varied of photographs can be inserted in it, even though these photographs are nominally the same size. Such a photo-viewing change device must therefore meet the requirement of functioning with the same reliability for all of these different photographs.

DETAILED DESCRIPTION

Figure 1:
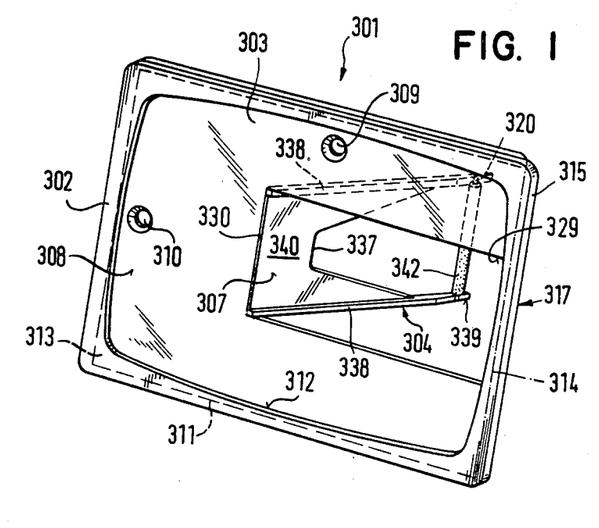
FIG. 1 is a front view, in perspective, of a first example of an embodiment of a picture carrier standing on a flat surface.
Figure 2:
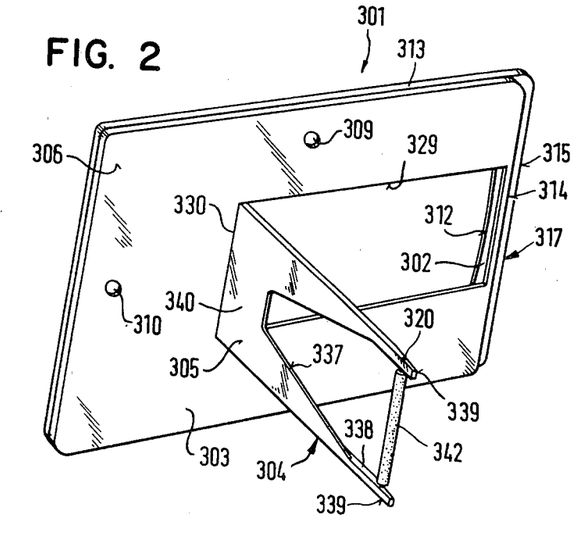
FIG. 2 is a rear view, in perspective, of the picture carrier of FIG. 1 standing on a flat surface.

FIGS. 1 and 2 will be referred to in detail first of all; in these drawings the picture carrier, indicated as a whole by 301, is shown standing horizontally on a surface. This picture carrier consists essentially of a frame 302, a rear wall 303 joined thereto and preferably integrally formed therewith, and a prop 304, which, since it serves to support the picture carrier, may also be referred to as a stand.

The prop 304 is pivotally mounted in the rear wall 303 in such a manner that when the picture carrier 301 is not standing up the prop can be pivoted into the rear wall so that its rear side 305 is flush with the rear side 306 of the rear wall 303 and/or its front side 307 is flush with the front side 308 of the rear wall 303. A transport roll or roller 342 is mounted in the prop 304 and is described in detail further below.

The picture carrier 301 furthermore has two holes 309 and 310, of which one hole 309 is provided in the rear wall 303 halfway along the length of the picture carrier 301 and in the vicinity of one of its longer edges and the other hole 310 is provided halfway across the width of the picture carrier and in the vicinity of one of its shorter edges. These holes enable the picture carrier to be hung from an appropriate projection on the wall, for example, a nail head, a screw head or the like.

The picture carrier 301 can be stood or suspended both in the upright and in the horizontal position. The picture, which is not shown in FIGS. 1 and 2, is located in a gap or compartment 313 matching its thickness, which extends between the front side 308 of the rear wall 303 and the rear side (not shown) of the frame 302 in the region extending between the broken line 311 shown in FIG. 1 and the inner edge 312 of the frame 302. In the region of one edge, which is in fact a longitudinal edge 314, of the picture carrier 301, this gap 313 extends right through to the outside, so that the picture can be inserted into the picture carrier 301 at this edge and in the inserted position is supported by the front side 308 of the rear wall 303 and is displayed over the area surrounded by the inner edge 312 of the frame 302.

The thickness of the gap 313 is chosen in accordance with the thickness of the picture and where applicable, especially in the case of very large formats, in accordance with the thickness of a transparent cover plate and/or a rear backing plate or foil. For normal purposes, the thickness of the gap is between 0.1 and 1 mm. preferably, between 0.25 and 0.75 mm, especially preferably between 0.4 and 0.6 mm. In some instances the gap or compartment 313 may be thick enough or deep enough for two or more sheets in a pile, for storing extra sheets for periodic use.

At the area at which it joins the outer side of the picture carrier the gap 313 may be widened in cross section in the shape of a funnel over the entire gap length to facilitate the insertion of a picture. It is especially preferred, however, so to design the gap 313 at this area that the lateral edge 314 (indicated in FIG. 1 by a dot-dash line) of the rear wall 303 is set back along the opening area of the gap 313 with respect to the lateral edge 315 of the frame 302 of the picture carrier so that the wall 316 (not directly visible in FIGS. 1 and 2, but see FIGS. 6 and 9) of the continuous gap 313 is shortened on the outer side of the picture carrier with respect to the other wall 318. The part of the wall 318 which projects beyond the wall 316 thus forms a lateral stop for a picture to be inserted into the gap 313, whereby the insertion operation is facilitated. A funnel-shaped widening 319 may additionally be provided by a chamfer 321 of the wall 316 extending over the entire width of the gap 313, as shown in FIG. 21.

Figure 3:
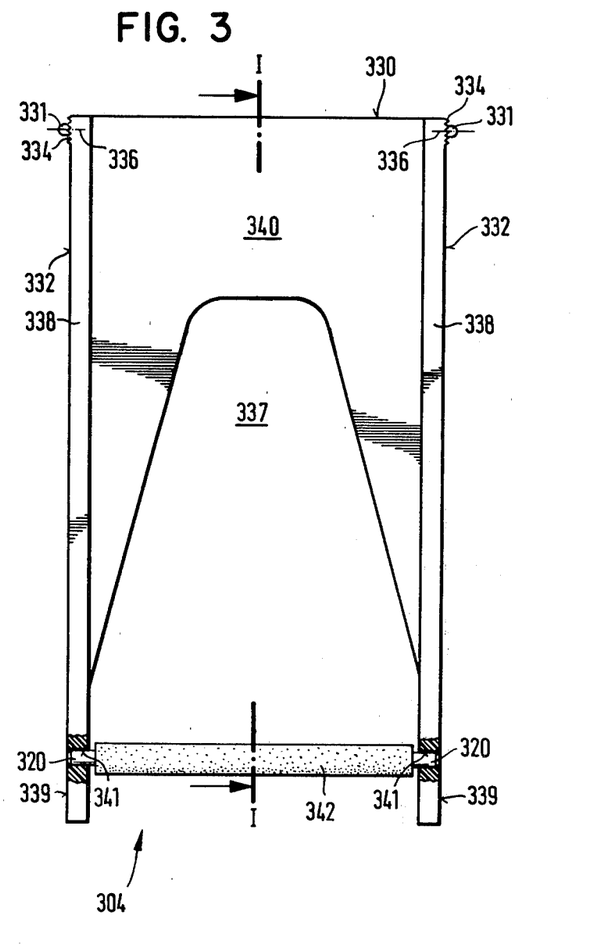
FIG. 3 shows in plan view and partly in section, a prop which can be attached to the rear wall of a picture carrier.
Figure 4:
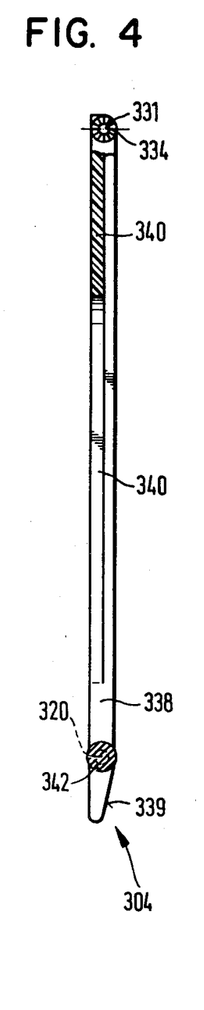
FIG. 4 is a section along the line I—I through the prop shown in FIG. 3.
Figure 5:
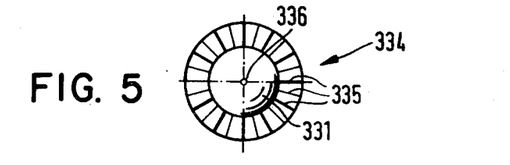
FIG. 5 is a plan view of a serrated ring to lock the position of the prop shown in FIGS. 3 and 4.

The rear wall 303 furthermore has a preferably rectangular recess 329 in which prop 304, which is explained in greater detail in an embodiment shown in FIGS. 3 to 5, can be recessed. For this purpose the prop 304 may be pivotally mounted on the rear wall 303 in such a manner that it can be pivoted backwards out of the rear wall 303 at one of its lateral edges, preferably at the lateral edge 330 perpendicular to the longitudinal direction, for which purpose, in the embodiment according to FIGS. 3 to 5, the ends of the lateral edge 330 take the form of preferably spherically-shaped pins 331, which project beyond the lateral edges 332 that extend in the longitudinal direction of the prop 304, and which engage in complementary depressions which are provided in the lateral edges of the recess 329, and into which they may be resiliently inserted.

So that the prop 304 remains or can be locked in a wide variety of inclined positions, although in certain circumstances jamming the prop in the rear wall in the region of the pins 331 may be adequate, there is provided around one of the pins 331 or, as shown in FIG. 3, around both pins 331, a so-called friction and/or locking area 334, which in the present case is a serrated area and is shown on an enlarged scale in FIG. 5. The teeth 335 of this area extend radially with respect to the pivot axis 336 of the prop 304 and likewise project slightly beyond the lateral edges 332 of the prop 304, as shown in FIG. 3. Although it is in principle possible to provide corresponding teeth 335 on the face of the rear wall to which the locking area 334 is adjacent, in the present embodiment this is not absolutely necessary because the edges of the rear wall that contact the locking area 334 may in any case act to a certain degree as "counter detents" in conjunction with the jamming action exerted by the rear wall.

Although the prop 304 may for the remainder be a flat, especially rectangular member matching the recess 329, which is provided with a recess 337 for the purpose of taking hold of it and pivoting it away from the rear wall 303, to save material it may instead have two longitudinal bars 338, which extend radially from the pivot axis 336 and are preferably tapered at their ends 339 remote from the pivot axis (see FIGS. 1, 2, 4 and 6) and which are joined to one or more transverse bars 340, which in the present case are planar. The thickness of the or each transverse bar 340 is smaller than that of the longitudinal bars 338, and in this case too a recess 337 is provided for taking hold of the prop and pivoting it out from the rear wall 303 and for accommodating a transport roll or roller 342.

For the latter purpose, in the region of the end of the prop 304 remote from the pivot axis 336, in the present case on the corresponding end of the longitudinal bars 338, a hole 341 is provided in each case. These holes act as a bearing for the axle 320 of a transport roller 342.

The recess 329 extends to the edge of the picture carrier a little beyond the inner edge 312 of the frame 302 (see FIG. 2). In this manner the rear side of the frame 302, as seen in FIG. 2, forms a stop for the transport roll or roller. When the picture carrier 301 is empty this is a direct stop, whereas it is an indirect stop when a picture is inserted because then the edge of the picture is disposed between the stop and the lower end 339 of the prop. As a result of this stop, if no transparent cover plate is provided for the front side of the picture, the picture disposed in the picture carrier cannot be damaged by the prop 304 being pivoted into the rear wall because the latter is prevented from pressing the picture out or even "piercing" it, and, above all, this stop then forms a support for the front side of the picture in the region in which it engages with the transport roll or roller 342.

Figure 6:
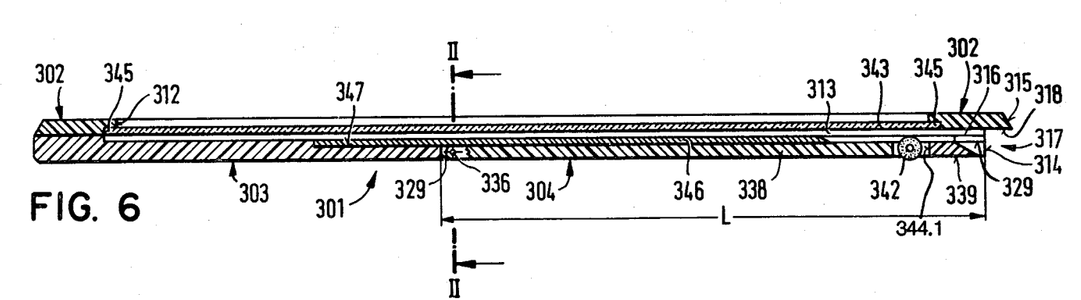
FIG. 6 is a longitudinal section through a second example of an embodiment of a picture carrier according to the invention.
Figure 7:
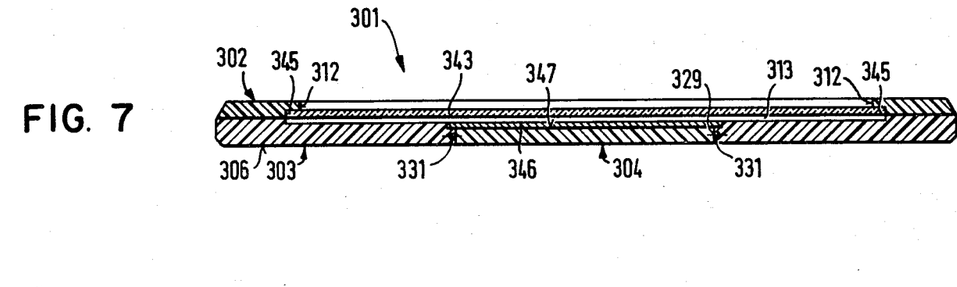
FIG. 7 is a cross section along the line II—II through the picture carrier shown in FIG. 6.

In the embodiment of a picture carrier shown in FIGS. 6 and 7 there is a freely rotatably mounted transport roll or roller 342, which is arranged in the region of the gap 313, which extends through to the outside of the lateral edge 317 of the picture carrier, opposite a support face for the front side or a part of the front side of the picture. This support face is formed in the present embodiment by the rear side, facing the picture, of a transparent cover plate 343.

The roll or roller 342 is arranged in the region of that end of the prop 304 which is remote from the pivot axis 336 of this prop, either in the general recess 337 (see FIGS. 1–3) or in a special recess 344, shown in FIG. 6. The roll or roller 342, consists of material, especially rubber, that is preferably grooved, fluted, knurled or roughened in some other manner, so that there results a good frictional engagement of the circumference of this roll or roller with the rear side of the picture, not shown in FIGS. 6, 7 and 9, the picture being disposed between the transparent cover plate 343 and the rear wall 303.

The roll or roller 342 makes it possible in a very simple manner for the particular picture to be conveyed into the picture carrier easily and without the risk of creased areas forming, by taking hold of that circumferential side of the roll or roller 342 which is accessible from the outside in order to rotate the roll or roller. In the same manner the picture can thereby be effortlessly removed from the picture carrier. Since the roll or roller is always pushed onto the rear side of the picture when operated, because it is attached to the free end of the pivotable prop 304, and can thus be moved onto the picture, good engagement between the circumference of the roll or roller and the rear side of the picture is always guaranteed.

The transparent cover plate 343, with which the front side of the picture is covered, is so attached that its lateral edges 345 are accommodated and held in the gap 313 between the rear wall 303 and the frame 302. In the picture carrier according to FIGS. 6 and 7 the gap 313 serves not only (as with the picture carrier shown in FIG. 9 and described hereinafter) to accommodate the picture but also to accommodate the transparent cover plate 343. So that this cover plate remains in the picture carrier when the picture is changed, the thickness of the gap 313 extending to the outside is smaller than the thickness of the cover plate. The transparent cover plate 343 can be changed in a simple manner by taking apart the frame 302 and the rear wall 303, when these are joined together, for example, by a plug joint which may consist of cylindrical projections and holes complementary thereto.

The transparent cover plate 343 preferably consists of mineral glass, but may equally consist of a transparent plastics material, and it may furthermore be tinted, especially blue, pink, gold, or silver, or may be smoked. Furthermore, this cover plate may consist of material that is dazzle-free and non-reflective or of material that has been made dazzle-free and non-reflective.

An opaque cover plate 346 is arranged in the region of the recess 329 provided for countersinking the prop 304 in the rear wall 303. This cover plate is displaceable between at least one first and at least one second position, of which the first position is shown in FIG. 6. In this position the opaque cover plate 346 leaves open a portion of the rear side of the picture so that the latter can be taken hold of directly or, as shown in FIG. 6, so that the picture can be taken hold of by means of the roll or roller 342, that is to say, the cover plate 346 leaves free a portion of the recess 329 in the region of the recess 337 or 344.1, so that the picture disposed in the picture carrier is taken hold of by the roller or roll 342 or by hand through the recess 329 and can be removed laterally from the picture carrier or, when it is to be introduced, fully inserted into the picture carrier. In the second position, which is not shown, the cover plate 346 has been moved so far to the right in FIG. 6 that its righthand end comes to rest under the frame 302, so that as a result it completely covers that portion of the rear side of the picture which is left open by the recess 329 and is not disposed under the rear side of the frame.

By this means, a picture disposed in the picture carrier, especially when the prop 304 is pivoted out from the rear side 303, is prevented from receiving "light flecks" which would otherwise occur if the picture carrier received stronger light from behind than from in front, which may be the case, for example, when it is stood on a desk with its back to a window.

For the slidable quidance and accommodation of the opaque cover plate 346, a depression 347 is provided in the front side of the rear wall facting the picture. The depth of this depression is preferably the same as the thickness of the opaque cover plate 346. This depression 347 extends, as shown partially in FIG. 19, preferably at all sides beyond the edges of the recess 329, so that the cover plate 346, the breadth of which is equal to the breadth of the depression 347 in FIG. 19 and the length of which is equal or preferably slightly larger than the length L of the recess 329, in the second position reliably blocks any light from the rear side of the picture.

Figure 8:
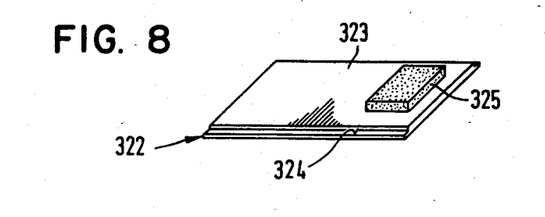
FIG. 8 is an embodiment of a transporter slider member in perspective view.

The opaque cover plate 346 may also be constructed as a transport slider member 322 (see FIG. 8, 9, 10), in which case, of course, the roll or roller 342 is omitted since the transport slider member 322 has the same task. It consists essentially of a plate 323, a lug or any other member mounted so as to be displaceable in the direction of insertion of the picture, on which member there are provided for mounting it, for example, guide means 324 that engage in complementary guide means 324.1 that are provided in the rear wall 303.1 or the prop 304.1 or, provided that the entire rear wall is constructed as a transport slider member, in the frame 302.1. The transport slider member 322 has on its side facing the rear side of the picture a retentive element 325, for example a small rubber patch, which carries the picture along. For clarity the thickness has been considerably enlarged in FIG. 8, for the retentive element 325 may, of course, be very thin, for example a thinly applied layer of rubber or plastics material.

So that the retentive element 325 does not carry with it a picture in the direction that is not desired, the transport slider member is so constructed or displaceably mounted that a certain minimum pressure is required to bring the retentive element 325 into firm engagement with the rear side of the picture, so that by alternately exerting in each case a relatively heavy and a fairly light pressure on the transport slider member 322, the user is able to transport the picture in the desired direction.

In this regard, it will be seen that there is a rather loose fit between the guide means 324 on the plate 323, and the guide means 324.1 of the longitudinal bars 338.1 of the prop 304.1. By pressure applied from the outside of the rear wall, against the plate 323, the plate may be flexed slightly or may be moved slightly in the guide means 324.1 so that the retentive element 325 will come to bear against a picture in the gap 313.1.

Figure 9:
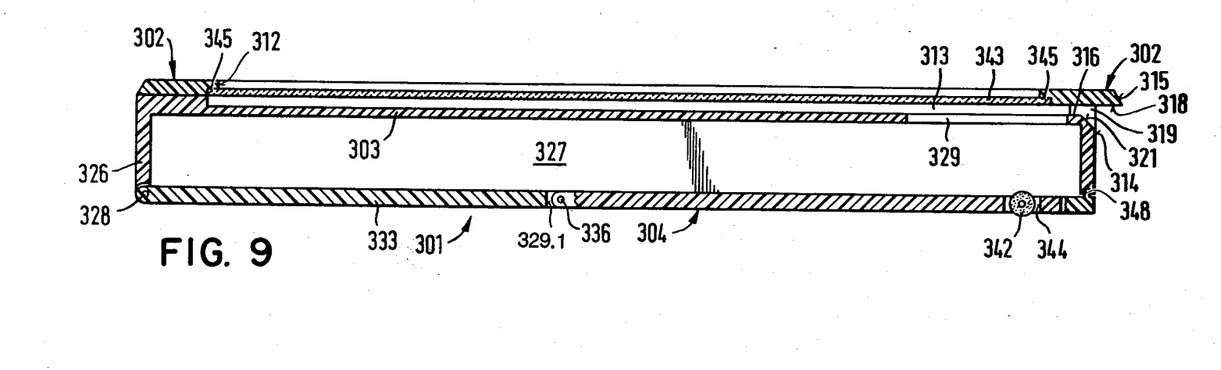
FIG. 9 is a section through a third example of an embodiment of a picture carrier according to the invention having a compartment for receiving additional pictures.
Figure 10:
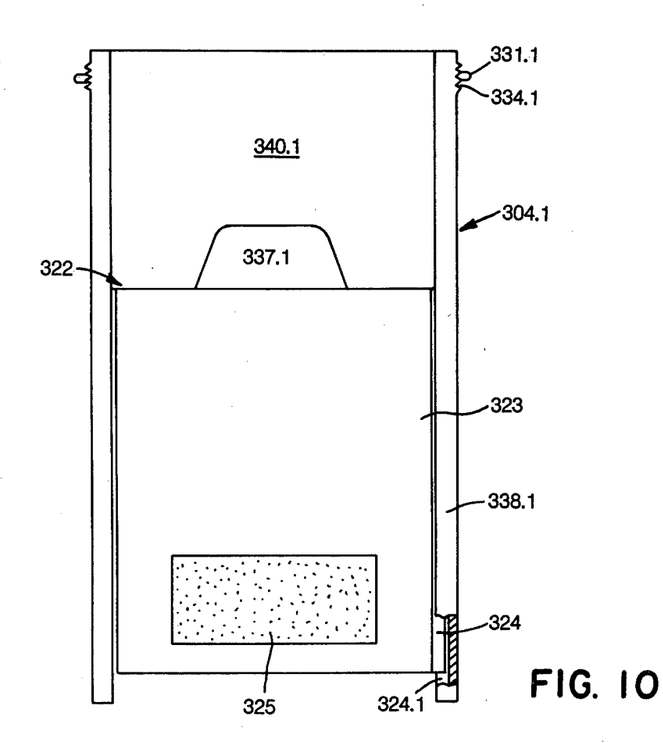
FIG. 10 is a plan view and partly in section of a prop which can be attached to the rear wall of a picture carrier.
Figure 11:
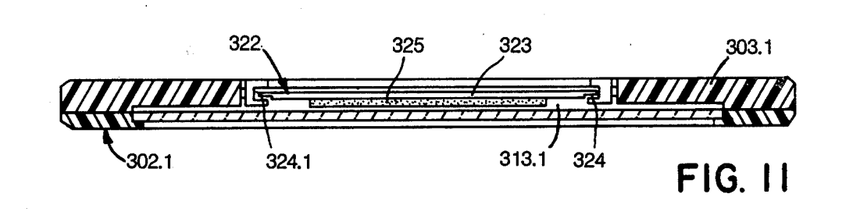
FIG. 11 is a cross section through the picture carrier embodying the prop of FIG. 10.

In the embodiment of FIG. 9, on the rear side 303 of the picture carrier 301 there is provided a compartment 326 which may be integral with the rear wall 303 and in the interior 327 of which other pictures may be kept. The recess 329 has in this case remained in the rear wall 303, whereas the prop 304 together with the transport roll or roller 342 are provided in a recess 329.1 in the lid 333 pivotally mounted at 328. This lid, which now forms the actual rear wall of the picture carrier 301 is normally held closed by a locking joint 348. To operate the roll 342 the additional pictures are removed from the compartment 326 and, after closing the lid 333, the prop 304 is then pivoted towards the rear wall 303 until the roller 342 engages on the picture. In this manner the user is able to replace a picture inserted in the gap 313 by another picture from the compartment 326.

The picture carrier according to the invention, depending on the embodiment, has all, or at least some, of the following advantages:

(a) The picture carrier is simply designed and has an aesthetic appearance, the slot in the preferred embodiment enabling a picture to be effortlessly and especially easily inserted into the picture carrier.

(b) The picture carrier is operationally safe and reliable; in particular the picture is arranged self-mounted in the picture carrier, and may easily be inserted and removed by the transport roll or roller or the transport slider member.

(c) The picture carrier is light and simple to handle, for the picture simply has to be introduced through a slot at the side and can easily be changed by anyone.

(d) The picture carrier is versatile, for it makes it possible for a picture to be displayed either in the upright or horizontal position and in the suspended or stand-up position. For the latter purpose, it has a self-locking prop which can be fully countersunk in the rear wall, so that hanging on the wall is facilitated. For the purpose of hanging the carrier on the wall, holes are provided into which either when hanging horizontally or hanging upright the head of a nail can engage. Furthermore the picture carrier is versatile in its use in so far as it can advantageously be produced for all sizes of picture.

(e) The picture carrier can be produced at a favourable price; in particular it requires no glass cover, may be made in one piece or, when the prop is produced as a separate part, may be cheaply produced in two parts and requires very little material. Also expenditure on time is low and, on assembly, the prop with its pins snaps easily into the corresponding recesses in the rear wall. The frame may be completely or partially printed so as to achieve an ornamental effect.

(f) Finally, the picture carrier is simple to transport and especially in its embodiment for normal photographs can be sent in the form of a letter or in a letter, as there is no risk to the glass cover breaking because a glass cover is not used, and the fact that the prop can be completely countersunk in the rear wall favours dispatch in a letter.

I claim:

1. A picture carrier having a frame that defines a viewing aperture for the picture and means to support the front side of the picture adjacent the aperture, and having a rear wall that has a support face for the rear side of the picture, there being a gap formed between the rear wall and the frame joined therewith and extending at least partially around the frame, and a transport slider slidably mounted in a recess in the rear of said frame and having a retentive covering for engaging the picture in such a manner that the picture will be carried along with said transport slider, the slider yieldably mounting the retentive covering relative to the gap so that upon engagement through said recess of said transport slider, the retentive covering is brought into engagement with the rear side of the picture at an area of the picture against which the front side of the picture is supported for sliding the picture relative to said carrier frame.

2. A picture carrier according to claim 1, wherein the transport slider member is attached to a prop that is provided on the rear wall so that the picture carrier may be placed upright and which prop is preferably so arranged that it can be sunk flush in the rear wall and is pivotable out of the plane of the rear wall wherein the transport roll or roller or the transport slider member is preferably provided in the vicinity of the free end of the prop.

3. Picture carrier according to claim 1, wherein the lateral edge of the rear wall is set back along the gap extending as far as the outer side of the picture carrier with respect to the lateral edge of the frame of the picture carrier so that one wall of the continuous gap is shortened on the outer side of the picture carrier with respect to the other wall.

4. Picture carrier according to claim 2, wherein the prop can be locked in all or any predetermined angular position by spherical pins, which extend in the direction of the pivot axis and are resiliently inserted into recesses in the rear wall wherein annular locking areas, which extend transversely or perpendicularly to the pivot axis, are provided on the prop, which areas engage in each case with a counter area on the rear wall, and wherein the locking area are provided with teeth extending radially with respect to the pivot axis, wherein furthermore the locking area is around the pins.

5. Picture carrier according to claim 2 and an opaque cover plate on the rear wall, adjacent a recess in the rear wall for receiving the prop the cover plate being displaceable at least between a first position, in which it leaves open a portion of the rear side of the picture so that the picture can be gripped directly or by means of the slide, and a second position, in which it covers completely the portion of the rear side of the picture, which is left free by the recess, and extends beyond the rear side of the frame, wherein the opaque cover plate is arranged preferably in a depression in the front side of the rear wall.

6. Picture carrier according to claim 1, wherein the transport slider member is constructed as an opaque cover plate in the vicinity of the recess for the prop and at least in its one position completely covers the portion of the rear side of the picture that is left free by the recess and extends beyond the rear side of the frame.

7. Picture carrier according to claim 1, wherein the rear side of the picture carrier has a compartment for other pictures or the rear side of the picture carrier is constructed as a container for other pictures.

8. Picture carrier according to claim 1, wherein the entire rear wall of the picture carrier is constructed as a transport slider member wherein guide means for the rear wall are constructed preferably in the frame.

* * * * *